(12) United States Patent
Clark et al.

(10) Patent No.: US 7,894,064 B2
(45) Date of Patent: Feb. 22, 2011

(54) OPTICAL DEVICE FOR DISPERSING LIGHT

(75) Inventors: Stephan R. Clark, Albany, OR (US); Brett E. Dahlgren, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 11/972,557

(22) Filed: Jan. 10, 2008

(65) Prior Publication Data
US 2009/0180117 A1 Jul. 16, 2009

(51) Int. Cl.
*G01J 3/46* (2006.01)
(52) U.S. Cl. ........................... 356/402; 356/302
(58) Field of Classification Search .............. 356/402, 356/302, 303, 329; 348/340
See application file for complete search history.

(56) References Cited

U.S. PATENT DOCUMENTS

| | | | |
|---|---|---|---|
| 5,713,364 A * | 2/1998 | DeBaryshe et al. | ......... 600/476 |
| 5,923,434 A | 7/1999 | Lex | |
| 6,459,425 B1 | 10/2002 | Holub et al. | |
| 6,583,879 B1 | 6/2003 | Berg et al. | |
| 6,788,412 B2 | 9/2004 | Pfister | |
| 6,940,597 B2 | 9/2005 | Taylor et al. | |
| 7,027,160 B2 | 4/2006 | Sperling | |
| 7,132,644 B2 | 11/2006 | Grunert et al. | |
| 2004/0183937 A1* | 9/2004 | Viinikanoja et al. | ......... 348/340 |
| 2004/0222362 A1 | 11/2004 | Zelenka et al. | |
| 2007/0013978 A1 | 1/2007 | Watanabe et al. | |
| 2007/0103706 A1 | 5/2007 | Bing et al. | |

* cited by examiner

*Primary Examiner*—L. G Lauchman

(57) ABSTRACT

An optical device includes an aperture stop that limits an angular extent of light from an illuminated sample. A first lens is positioned between the aperture stop and a detector plane. A second lens is positioned between the first lens and the detector plane and is operable to map light from the aperture stop to the detector plane such that the light is averaged at the detector plane.

22 Claims, 3 Drawing Sheets

FIG. 2

OPTICAL DEVICE FOR DISPERSING LIGHT

BACKGROUND

One challenge of measuring color off or through a sample under test is the spatial inhomogeneity of the color of the sample. In other words, the color may vary somewhat over the sample. The inhomogeneity may be caused by fabrication error of the sample, inherent asymmetry of the sample, such as weave of paper on which the sample is formed or surface structure on the sample, as well as bending or distortion of the sample. As any one or many situations can occur in a color sample, measuring devices may provide inaccurate measurements of the color.

The effects of test sample inhomogeneity may become even more problematic when used with spatial arrays, where sensing may be spread out spatially. Each sensor may be provided color from different portions of the sample, which may or may not be the same, leading to measurement errors.

Prior color measuring approaches have included taking multiple measurements of the same sample in different positions, and then averaging them together. This approach brings uncertainty and additional errors into play, and further takes more time to measure and average properly. In other approaches, some kind of light pipe may be used to spatially scramble light reflected off or through the sample. The degree to which the scrambling or mixing can occur may depend on a spot size at the end of the pipe, the length of the pipe in relation to size, and input light distribution coming into the light pipe to be scrambled. If a large sample is desired, then the pipe is long, which may not fit well with cost and space constraints for a particular measurement device.

BRIEF DESCRIPTION OF THE DRAWINGS

FIG. 2 is a table specifying parameters for various lenses according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
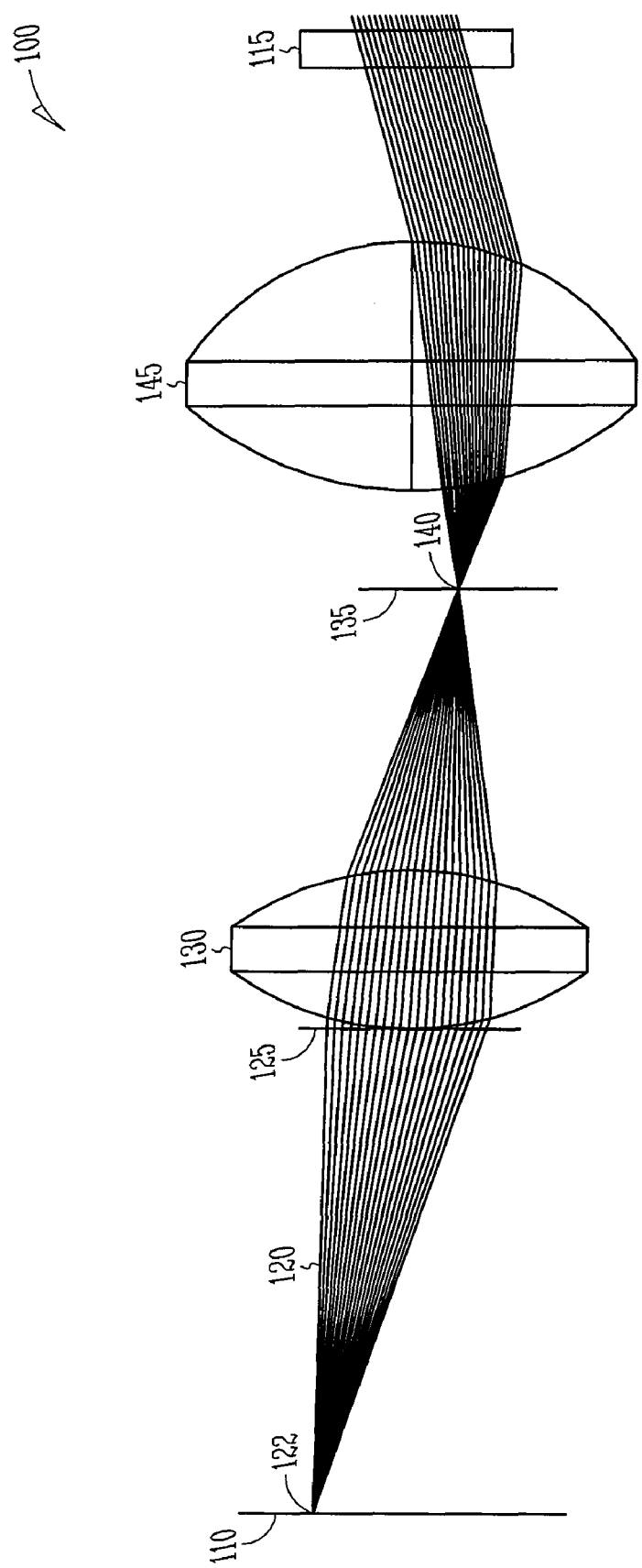
FIG. 1 is a block diagram of a system for providing spatial averaging of light according to an example embodiment.

FIG. 1 is a block diagram of a system 100 that receives light from an object plane 110 and spreads it over a desired surface area, such as a detector plane 115. In one embodiment, the object plane is a sample, such as a piece of colored paper or other colored object. Light is reflected off of, or transmitted through the object plane 110 as represented at 120.

Light 120 as shown illustrates light spreading out from a single point 122 on the object plane 110 to an aperture stop 125. Aperture stop 125 in one embodiment is a planar structure with a hole in it. Aperture stop 125 may be thought of as a plane or location on which any object plane point will spread light over and mix with all other object field points emanating for the object and that are collected by the optical system. Thus, while only one point 122 is illustrated with corresponding light 120 spreading out from it, all points on the object plane will have a corresponding light spreading out from it. Light 120 is illustrated as only consisting of light rays that are passed by aperture stop 125 for simplicity, as is the illustration of only light emanating from one point 122 on the object plane 110.

In one embodiment, aperture stop 125 is positioned proximate lens 130 on either the front of lens 130 as illustrated or behind lens 130. The optics may be changed to ensure proper light transmission to the detector plane 115 to obtain desired spatial averaging/scrambling. In a further embodiment, the outside diameter edges of lens 130 may be used as an aperture stop. The various positions proximate lens 130 for accomplishing an aperture function may result in different ray paths for the light, and corresponding modifications to optical components to obtain the desired spatial averaging/scrambling at the detector plane 115.

A first lens 130, which may be a single lens, or a lens group in various embodiments, focuses the light 120 toward a field stop 135. Again, only one point, 140 is shown at the field stop 135, but it is understood that all the points on object plane 110 will be focused at field stop 135, forming an image of the object plane 110. In one embodiment, field stop 135 limits the area of the sample that will be passed through to the desired surface area of the detector plane 115.

Light from the field stop 135 is passed on to a second lens 145, which may be a single lens or group of lenses in various embodiments. Second lens 145 operates to spread the light out over the desired surface area of the detector plane 115. Second lens 145 images the aperture stop plane 125 to detector plane 115. The field stop makes it possible to select the light that is of interest. For example, when a reflectance measurement of a color sample is being made, a secondary light source may be used to illuminate the sample. When this light hits the sample, it is reflected off, and the sensor 115 sees the combination of the light incident on the sample multiplied by the reflectance of the sample.

If there is other light present other than the desired secondary light that reflects off the sample and gets into the sensor 115, then an error may occur. Most often, the light intensity of the desired secondary light is made such that any undesired light that is visible in the testing area is unimportant for a given accuracy level. For high accuracy, field stop 135 may be used to stop all light that is not in the imaging area of the test sample, thus increasing accuracy of the color measurement. In other embodiments, field stop 135 refers to a virtual plane at which an image of the sample is focused, and need not include any physical structure.

In some embodiments, the field stop 135 also enables control of the spatial area of the sample that is considered. If a small illumination spot on the sample is used, the field stop allows focusing on the area of the sample illuminated by the small illumination spot, preventing color from other areas affecting measurements.

The basic function of lens 145 may also be referred to as a pupil relay. A pupil is the image of the aperture stop. As illustrated, light from one point, 122, on the sample that is reflected from or transmitted through the sample will have some angle distribution coming off that point. The angle distribution may be referred to as a bundle of light. This bundle of light is limited by the aperture stop 125 which serves as an entrance pupil. At the plane of the aperture stop 125, the light from any point on the sample will be spread out over the surface of the aperture stop plane. Thus, every object point that the aperture stop 125 can see will have light spread out on this same aperture stop plane. Light from other points in the test sample will also be mixed at the aperture stop plane. This light is basically transmitted by the first lens 130 and second lens 145 to the detector plane 115, where it is essentially scrambled. By scrambling the light at the detector plane 115, the system is essentially insensitive to spatial variation at the sample. Thus, the spread out light from the aperture stop plane is mapped onto the detector by a variety of optical elements.

In various embodiments, the scrambling area can be large, while the length to do the pupil imaging is relatively small, allowing a sufficient quality of mixing without significant light loss. The optical system 100 may be simple and compact, keeping costs low if desired.

In one embodiment, a method utilizing system 100 includes receiving light from a sample at the object plane 110. The received light from the sample is selectively transmitted at an aperture plane wherein light from each point of the sample is spread over the aperture plane. The spread out light from the aperture plane is mapped to a detector plane such that the light from the sample is averaged and scrambled over a desired portion of the detector plane.

In one embodiment, an aperture stop 125 is used to selectively transmit the received light from the sample. In further embodiments, extraneous light is selectively blocked from reaching the detector plane 115. In a further embodiment, mapping of the spread out light is done by a combination of a first objective lens and a second lens. The second lens may be formed as a lens group that provides optically homogenized light from the image to the selected portion of the sensor.

Figure 2:
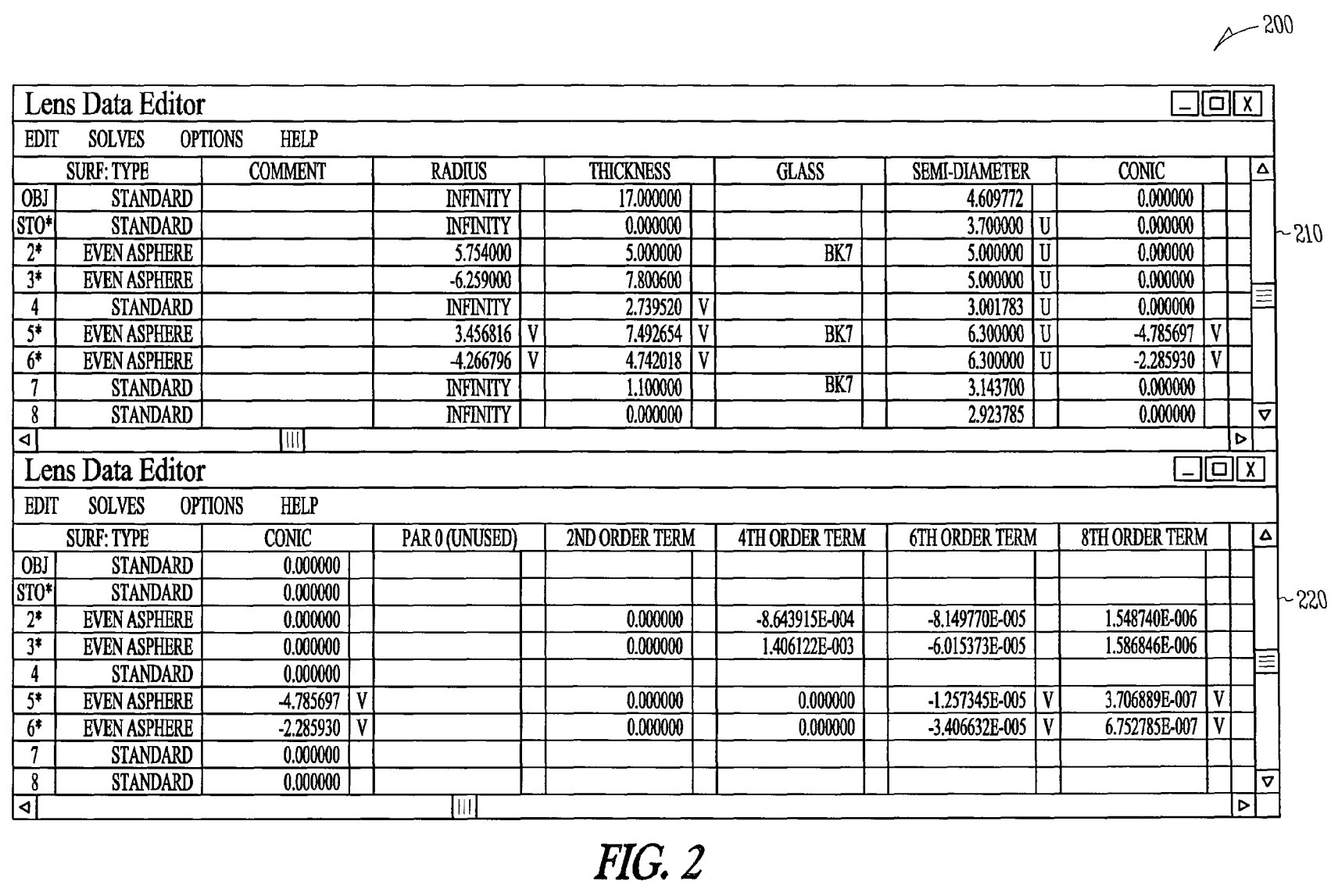

FIG. 2 is a table 200 illustrating specifications for the first and second optical surfaces, or lens groups, for one embodiment. While one such specification is shown, many other combinations of optical surfaces with different specifications may be used to produce the desired scrambling and pupil mapping effects described herein. Table 200 is reproduced from a common lens data editing application, wherein a first column identifies an optical surface, and a second column identifies an optical surface type for that row. In a top table portion 210, a radius, thickness, glass, semi-diameter and conical value are provided for each lens.

The rows in table 200 describe optical elements in system 100. Thus, the object plane 110 has an infinite radius. A thickness column indicates a distance to the next optical element, the aperture stop 125, which is described in the second row labeled "STO*". The row beginning with "2", is the first surface of lens 130, having a distance specified to a second surface of lens 130 defined in the row labeled "3". In one embodiment, the distance between the aperture stop 125 and first surface of lens 130 is approximately zero. "4" defines the field stop, and rows "5" and "6" define the surfaces of the second lens 145. "7" corresponds to a cover plate, and "8" defines an air space between the cover plate and detector plane 115. A positive radius of curvature in the column headed with "Radius" indicates a curve toward the left of the drawing, while a negative number indicates a curve extending toward the right.

In a bottom table portion 220, the lens types and conical information is repeated for each optical element, and various order terms for the curvature of each optical are specified, such as second order term, fourth order term, sixth order term and eighth order term in one embodiment. These terms describe variations from a spherical surface for each lens, and provide a recipe to one of skilled in the art regarding how to make each lens.

Figure 3:
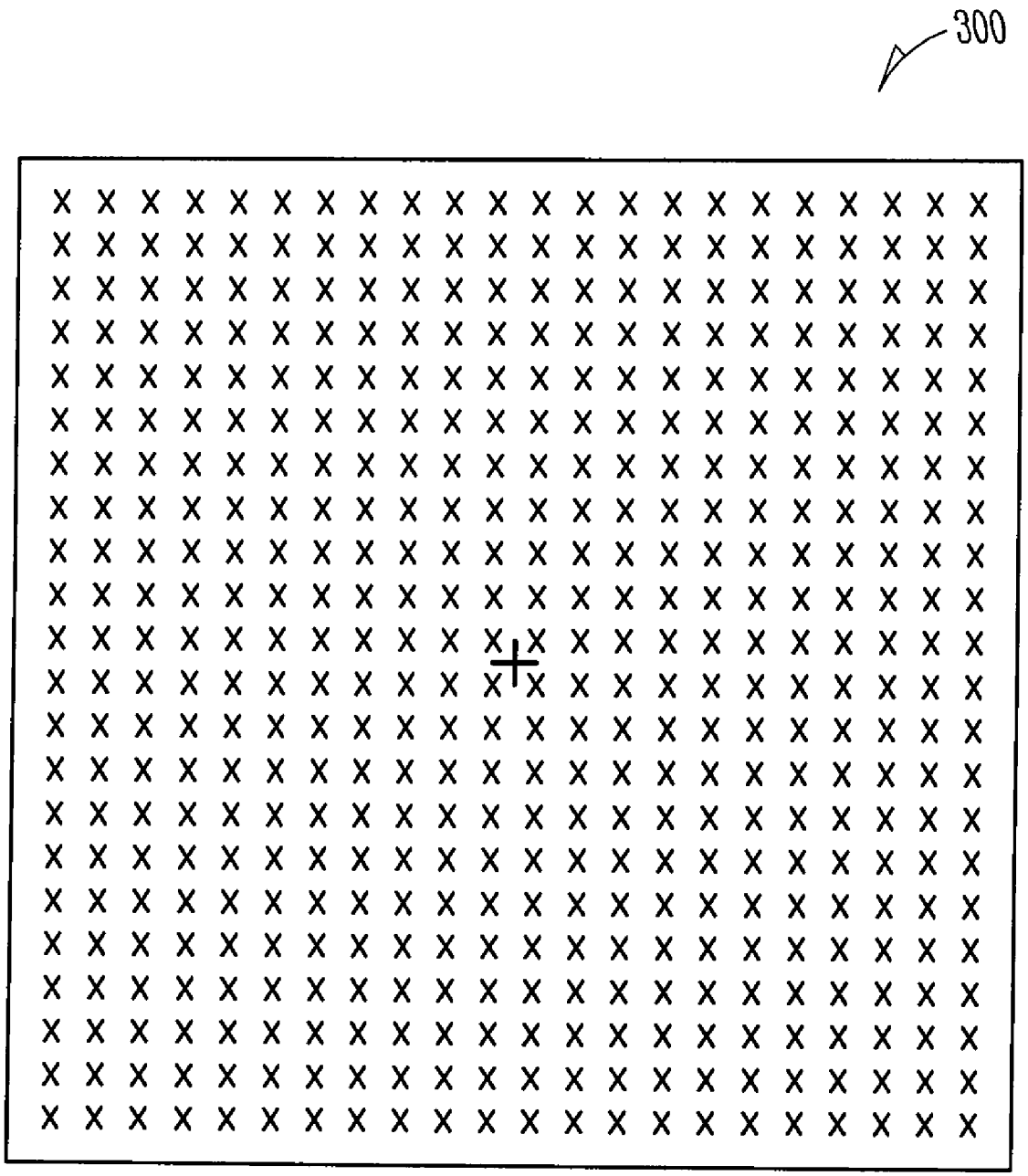
FIG. 3 is a top view representation of a detector plane illustrating spatial averaging/scrambling according to an example embodiment.

FIG. 3 is a top view representation 300 of detector plane 115. Multiple color sensors are indicated in an array on the detector plane view 300. One filed point field stop 135 is expanded and directed by lens 145 to cover the entire detector plane, or at least a desired portion of the detector plane 115. All the other points at the field stop 135 cover the same area of the detector plane 115, resulting in excellent spatial averaging/scrambling.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An optical device comprising:
   a field stop operable to limit an area of a sample observable to a sensor;
   an aperture stop that limits an angular extent of light from an illuminated sample;
   a first lens positioned proximate the aperture stop for focusing an image of the sample at the field stop; and
   a second lens positioned between the field stop and a detector plane operable to disperse light from each point of the image at the field stop over a common light sensitive are of the sensor where the light from different points of the sample overlap.

2. The optical device of claim 1 wherein the aperture stop comprises a planar surface with an opening for allowing light to pass.

3. The optical device of claim 1 wherein the field stop comprises a planar surface with an opening for allowing light to pass, and further wherein an edge of the first lens forms the aperture stop.

4. The optical device of claim 1 wherein the aperture stop is adjacent the first lens and positioned between the first lens and the sample.

5. The optical device of claim 1 wherein the first lens comprises a lens group.

6. The optical device of claim 1 wherein the second lens comprises a lens group.

7. The optical device of claim 6 wherein the second lens provides optically homogenized light from the image to the selected portion of the sensor.

8. The optical device of claim 1 wherein the selected portion of the sensor comprises a detector plane having an array of color sensors.

9. An optical device comprising:
   an aperture stop that limits an angular extent of light from an illuminated sample;
   a first lens positioned proximate the aperture stop; and
   a second lens positioned between the first lens and a detector plane operable to map light from the aperture stop to the detector plane such that the light is averaged at the detector plane.

10. The optical device of claim 9 and further comprising a field stop positioned between the first and second lenses.

11. The optical device of claim 10 wherein the field stop blocks extraneous light from reaching the detector plane.

12. The optical device of claim 9 wherein the first lens receives light from the illuminated sample and focuses the light to a point between the first and second lenses.

13. The optical device of claim 12 wherein the second lens receives light from the first lens and spreads the light over the detector plane.

14. The optical device of claim 9 wherein the second lens comprises a lens group.

15. The optical device of claim 14 wherein the second lens provides optically homogenized light from the image to the selected portion of the sensor.

16. A method comprising:
receiving light from a sample at an object plane;
selectively transmitting the received light from the sample at an aperture plane wherein light from each point of the sample is spread over the aperture plane; and
mapping the spread out light from the aperture plane to a detector plane such that the light from the sample is averaged and scrambled over a desired portion of the detector plane.

17. The method of claim 16 wherein an aperture stop is used to selectively transmit the received light from the sample.

18. The method of claim 16 and further comprising blacking extraneous light from reaching the detector plane.

19. The method of claim 16 wherein mapping the spread out light is done by a combination of a first objective lens and a second lens.

20. The method of claim 19 wherein the second lens comprises a lens group that provides optically homogenized light from the image to the selected portion of the sensor.

21. The optical device of claim 1, wherein the second lens images light passing through the field stop onto the light sensitive area of the sensor.

22. The optical device of claim 9, wherein the second lens images light at the aperture stop onto the detector plane.

\* \* \* \* \*

UNITED STATES PATENT AND TRADEMARK OFFICE
CERTIFICATE OF CORRECTION

| | | |
|---|---|---|
| PATENT NO. | : 7,894,064 B2 | Page 1 of 1 |
| APPLICATION NO. | : 11/972557 | |
| DATED | : February 22, 2011 | |
| INVENTOR(S) | : Stephan R. Clark et al. | |

It is certified that error appears in the above-identified patent and that said Letters Patent is hereby corrected as shown below:

In column 4, line 3, delete "filed point field" and insert -- field point at field --, therefor.

In column 4, line 24, in Claim 1, delete "are" and insert -- area --, therefor.

In column 4, line 27, in Claim 2, delete "claim l" and insert -- claim 1 --, therefor.

In column 6, lines 1-2, in Claim 18, delete "blacking" and insert -- blocking --, therefor.

Signed and Sealed this
Fifth Day of July, 2011

David J. Kappos
*Director of the United States Patent and Trademark Office*